United States Patent [19]

Giordano

[11] 4,441,459
[45] Apr. 10, 1984

[54] CHICK DRINKER APPARATUS WITH AUTOMATIC WATER LEVEL CONTROL

[75] Inventor: Sebastiano Giordano, Caraglio, Italy

[73] Assignee: Giordano Poultry-Plast S.p.A., Caraglio, Italy

[21] Appl. No.: 388,364

[22] Filed: Jun. 14, 1982

[30] Foreign Application Priority Data

Jun. 22, 1981 [IT] Italy ................. 67860 A/81

[51] Int. Cl.³ .............................................. A01K 7/00
[52] U.S. Cl. .......................................... 119/72; 119/81
[58] Field of Search ................... 119/72, 78, 79, 80, 119/81; 137/150, 124, 131

[56] References Cited

U.S. PATENT DOCUMENTS

| | | | |
|---|---|---|---|
| 682,269 | 9/1901 | Poe | 137/150 |
| 2,142,556 | 1/1939 | Carr | 119/78 |
| 3,138,140 | 6/1964 | Byrd | 119/80 |
| 3,675,627 | 7/1972 | Myers | 119/72 |
| 4,274,365 | 6/1981 | Peters | 119/78 |

*Primary Examiner*—Hugh R. Chamblee
*Attorney, Agent, or Firm*—Sughrue, Mion, Zinn, Macpeak & Seas

[57] ABSTRACT

A chick drinker apparatus comprises a main supply receptacle connected to a water supply, and a number of drinkers with automatic water level control which are of a size suitable for chicks and are placed at a lower level than the supply receptacle. Each drinker is connected to the supply receptacle by a respective flexible siphon tube which has a resilient gripping member attachable to, and quickly removable from, the rim of the supply receptacle, and also independent priming means for transferring liquid from the supply receptacle to the respective drinker.

1 Claim, 2 Drawing Figures

U.S. Patent  Apr. 10, 1984  4,441,459
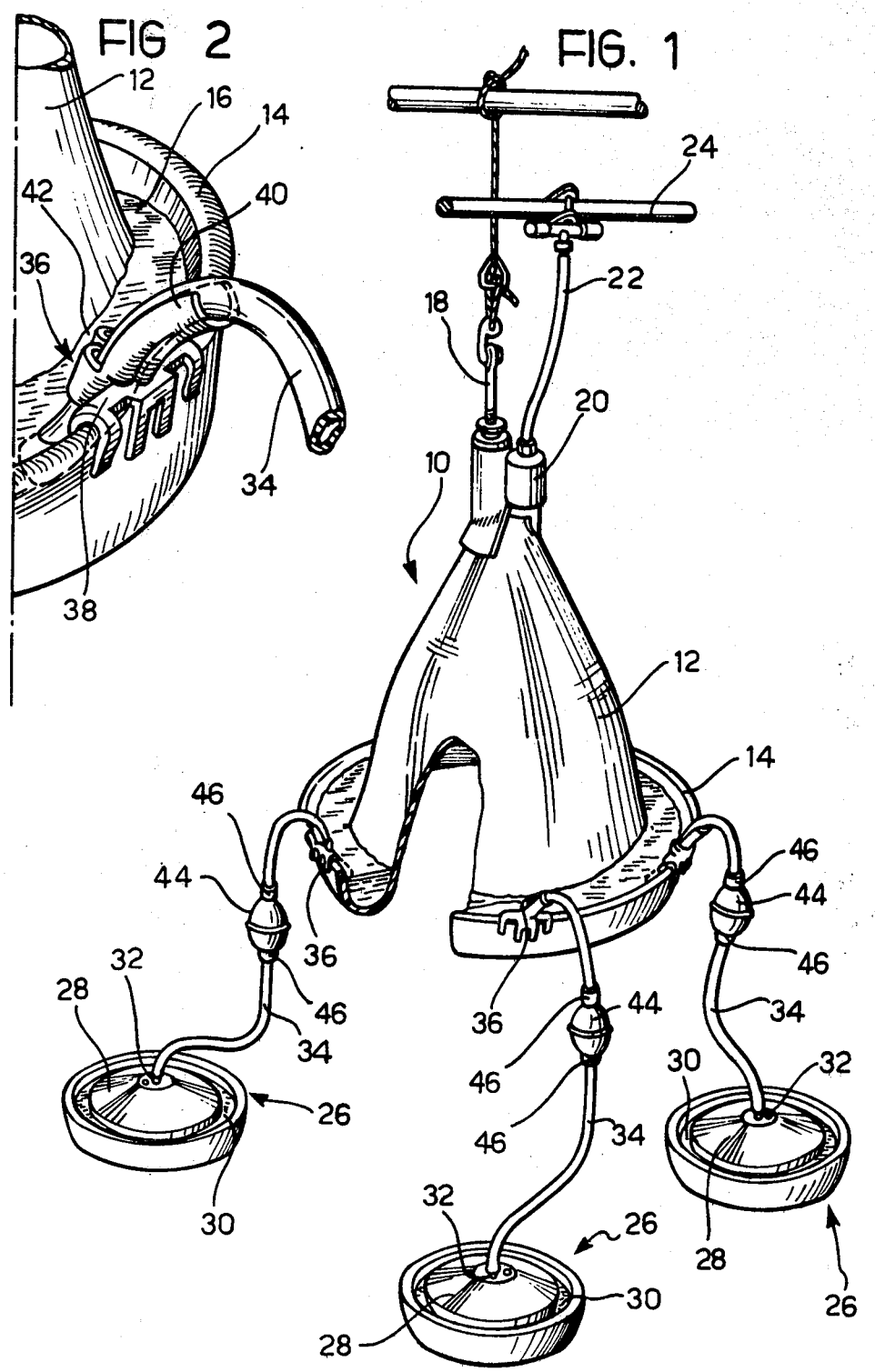

CHICK DRINKER APPARATUS WITH AUTOMATIC WATER LEVEL CONTROL

The present invention relates, in general, to drinkers with automatic control of the water level, particularly for rearing poultry and the like, and is more particularly concerned with chick drinker apparatus.

It is well known that, in battery houses, it is necessary to arrange a water mains system for supplying a number of drinkers, with automatic level control, which are usually suspended at a certain distance above the floor. The shape of the drinkers generally used for mature poultry is not suitable for chicks, however, due especially to the fact that the dimensions of these drinkers involve a serious risk of drowning for the chicks.

It is necessary, therefore, to have smaller automatic drinkers which usually rest on the floor and are shaped so that they can be used comfortably and safely by poultry in the first days of their lives. Since drinkers of this type are usually made for being connected directly to the water mains system of the battery house, however, it is necessary to remove the drinkers provided for the mature poultry and fit drinkers for the chicks until the latter are fully-fledged, after which the chick drinkers must be removed and replaced by the larger drinkers.

Clearly, these operations are complicated and difficult in view of the large number of drinkers usually found in a battery house, and require the employment of suitable personnel. Moreover, the replacement of the drinkers inevitably involves the spillage of water in the battery house, with obviously dangerous consequences for the chicks.

The object of the present invention is to avoid the aforesaid disadvantages by providing chick drinker apparatus with automatic water level control, which can be fitted and removed quickly and easily without having to disconnect the water supply to drinkers for the mature poultry.

In order to achieve this object, the apparatus according to the invention is characterised in that it comprises a combination of a main supply receptacle which is connected to a water supply and has a peripheral rim, and a number of drinkers of a type known in itself with automatic water level control, which are of a size suitable for chicks, the drinkers being placed at a lower level than the supply receptacle and being connected to the latter by respective flexible siphon tubes, each of which has an upper end fitted in a rapidly-removable manner onto the peripheral rim of the supply receptacle, so as to be immersed in the liquid contained in the latter, and is provided with independent priming means for transferring the liquid to the drinker.

The main supply receptacle may consist, advantageously, of a mature poultry drinker with automatic level control, for example, of the type comprising a hanging bell-shaped member with an annular channel at the bottom fed through an automatic shut-off valve. In this case, the outer circumferential edge of the annular channel lends itself excellently to the attachment of a number of siphon tubes connected to respective chick drinkers. While the latter are fitted, the main drinker automatically controls the depth of immersion of the siphon tubes, and simply has to be kept in its normal position of use, that is, at a distance of 20–30 cm from the floor, so as to be beyond the reach of the chicks. In this way, when the chick drinkers are removed, the main drinker will be ready for use by the now mature poultry.

Moreover, the apparatus according to the invention can be used, with advantage, for watering animals outside the battery house, for example, guineafowl, pheasants, or small animals raised in captivity, using flexible siphon tubes of such a length that they are able to convey the water to the outside of the battery house.

According to the invention, the priming means comprise a manually-operated priming pump incorporated in each siphon tube. This priming pump is preferably formed from a squeezable swelling with resilient return, which is located close to the upper end of the tube and allows the transfer of water to be primed avoiding any direct contact with water by the breeder. This is extremely important since the water intended for the chicks usually has disinfectant or medicinal additives which are harmful to man.

According to the invention, the upper end of each siphon tube is fitted with a resilient gripping member which can be push-fitted onto the peripheral rim of the main receptacle.

This characteristic renders the operations of fitting and removal of the tubes particularly easy and quick.

Further characteristics and advantages of the invention will become apparent from the following detailed description, supplied purely by way of nonrestrictive example, with reference to the accompanying drawings, in which:

FIG. 1 is a perspective view of apparatus according to the invention, and

FIG. 2 is a perspective view on an enlarged scale of one detail of FIG. 1.

Referring firstly to FIG. 1, there is shown, generally indicated 10, a drinker with automatic water level control, of the type commonly used for watering mature poultry inside a battery house. In the example illustrated, the drinker 10 is of the type which is the subject of Italian Utility Model Application No. 53,714-B-79 by the same Applicants and comprises, in brief, a bell-shaped member of moulded plastics 12 which has a turned-up edge 14 at the bottom defining an outer annular channel 16 around the base of the bell-shaped member 12. The bell-shaped member 12 has a stem 18 at its top for hanging the drinker 10 from a support structure, and also has a shut-off valve 20 connecting the drinker 10 to a water mains system 24 through a tube 22. The shut-off valve 20 is controlled by the weight of the bell-shaped member 12, and operates to keep a constant level of water in the annular basin 16.

Indicated by 26 are a number of drinkers with automatic level control, which have dimensions suitable for chicks. Each of these drinkers 26 is of a type known in itself, comprising a casing 28 connected at the bottom to an annular basin 30 and fitted at the top with a tubular inlet union 32. In the cavity of the casing 28 there is housed a float (not shown in the drawings) which cooperates with a valve seat (not shown) on the lower end of the tubular union 32 to keep a constant water level in the basin 30.

To the tubular union 32 of each drinker 26 is connected one end of a respective flexible tube 34, the opposite end of which is fitted with a resilient gripping member 36. As illustrated in detail in FIG. 2, the gripping member 36 consists of a single piece of moulded plastics and includes an attachment part 38 in the form of a fork which may be opened out resiliently, a curved, channel-shaped supporting part 40, and a resilient retaining part 42. The retaining part 42 serves to clamp, in a removable manner, the end of the tube 34 opposite the drinker 26, while the support part 40 serves as a rest and support for the portion of the tube 34 adjacent that end.

A priming pump 44 is formed from a swollen part of the tube 34 close to the gripping member 36. In effect, the tube 34 consists of two separate sections and the priming pump 44 is formed from a squeezable bulb with resilient return which is made, for example, from rubber and has a pair of aligned tubular unions 46 for connection to the aforesaid two sections. As can be seen clearly in FIG. 1, the length of the section of tube 34 between the drinker 26 and the priming pump 44 is considerably greater than that of the other section.

In use, the drinker 10 is usually kept at a short distance of about 20–30 cms above the ground, and is used to water mature poultry. This drinker 10 can be used in combination with the drinkers 26 for watering chicks, in the manner shown in FIG. 1. The drinkers 26, in this case, rest on the floor below the drinker 10, and the ends of the flexible tubes 34 opposite to the tubular unions 32 are fixed onto the basin 16. To effect this, it suffices to push the attachment parts 38 of the gripping members 36 over the peripheral rim 14 of the basin 16, so that the end parts of the tubes 34 are immersed in the liquid contained in the basin 16. The upper ends of the tubes 34, which are clamped by the respective retaining parts 42 and rest on their respective support parts 40, thus form loops with downwardly-turned cavities, and the tubes 34 therefore form siphons. In order to transfer water from the basin 16 of the drinker 10 to the basin 30 of each drinker 26, it suffices to prime the siphon formed by the respective tube 34 by squeezing the bulb 44 manually to expel the air in the tube. By continuing to squeeze the bulb 44 for a short time, atmospheric pressure is reestablished in the section of tube connected to the drinker 26, while in the other section a pressure is established which is slightly greater than atmospheric pressure by an amount equal to the depth of immersion in the water in the basin 16. When the bulb 44 is released, the latter springs back to its undeformed state, and the water in the basin 16 is drawn along the loop of tube 34 to start the siphon and supply the basin 30 of the drinker 26. The level of water in this basin 30 is controlled automatically by the float valve incorporated in the drinker 26, whilst the shut-off valve 20 of the drinker 10 allows the depth of immersion of the various tubes 34 to be kept constant.

When the use of the drinkers 26 becomes unnecessary due to the growth of the chicks, it suffices to remove the gripping members 36 from the rim 14 of the drinker 10, and remove the drinkers 26 which can be transferred for use in another battery house.

Naturally, while the principle of the invention remains the same, the details of construction and form of embodiment may be varied widely from that described and illustrated without going beyond the scope of the invention. Thus, for example, the drinker 10 could be replaced by another drinker of a different type, or even by a simple water tank, and the drinkers 26 could differ from those illustrated and described above.

I claim:

1. A poultry drinking apparatus comprising a main drinking apparatus in the form of a bell-shaped member having an annular channel at the bottom thereof for holding the supply of drinking water, automatic water level control means for controlling the water level in said annular channel, means for supporting said main drinking apparatus above ground level at a height suitable for mature poultry, a plurality of chick drinkers each having an annular channel for holding a supply of drinking water, automatic water level control means for controlling the water level in the channels of said chick drinkers, flexible siphon tubes each connecting a respective chick drinker to said main drinking apparatus, detachable means for connecting one end of each flexible siphon tube to said main drinking apparatus with said one end being disposed below the water level in the annular channel of said main drinking apparatus and hand operated priming means associated with each tube for initiating transfer of water to said chick drinkers with the automatic water level control means associated with said chick drinkers limiting the amount of water being transferred.

* * * * *